The specification in this patent is not in print.
6875X
Sheet 1-2 Sheets
P. Stackhouse.
Domestic Oven.
Patented Dec. 22, 1831.
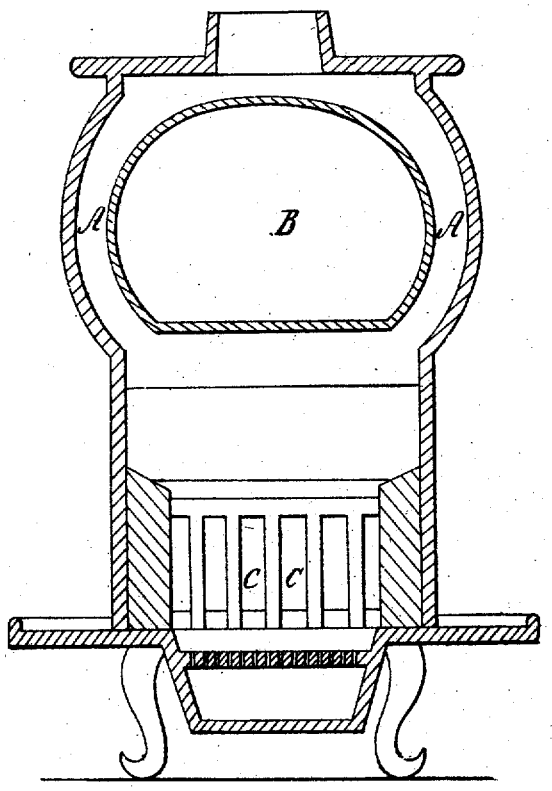
THE NORRIS PETERS CO., WASHINGTON, D. C.

6875X
Sheet 2-2 Sheets
P. Stackhouse.
Domestic Oven.
Patented Dec. 22, 1831.
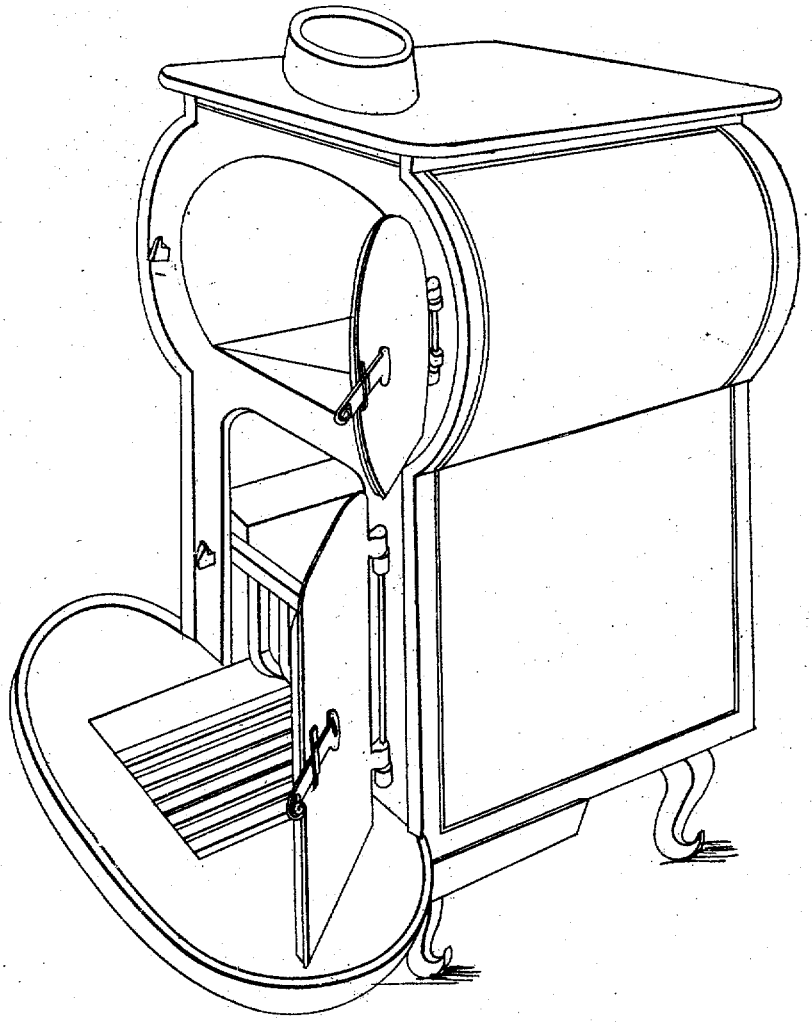
THE NORRIS PETERS CO., WASHINGTON, D. C.

Powell Stackhouse 6875X
Letters Patent

The schedule referred to in these Letters Patent and making part of the same containing a description in the words of the said Powell Stackhouse himself of his improvement in the manufacture of Stoves

---

This improvement on the usual construction of Stoves consists in making the flues circular or elliptical instead of turning at one or more angles by which the heat finds a more ready passage from the fire or furnace round the cooking chamber or oven of the Stove and imparts to it a greater degree of heat more uniformly diffused than by any previous invention. To construct a Stove according to this improvement the plates of the Stove enclosing the flue or flues must be made or cast in a circular or elliptical form connecting at one end with the fire or furnace and at the other with the pipe or upper chamber with which the pipe connects and the flue or flues may pass up either in the rear front or sides of the Stove and the latter mode is practised by this inventor. This improvement may be useful in a Stove for any kind of fuel by the greater economy in its consumption but is especially so in cooking Stoves to be heated by Anthracite coal. the more equal diffusion of heat round the oven performing more equally on all sides the operation of cooking baking &c. Witness my hand this 1st day of December 1831

Edward D. Corfield }
William Corfield } Witnesses

Powell Stackhouse 250 n 85

E.D.
C.W.

Patented 22 Dec 1831